(12) United States Patent
Zangi et al.

(10) Patent No.: US 7,978,646 B2
(45) Date of Patent: Jul. 12, 2011

(54) HYBRID CONTENTION-BASED AND SCHEDULE-BASED ACCESS TO A COMMUNICATION LINK

(75) Inventors: Kambiz C. Zangi, Chapel Hill, NC (US); Jiann-Ching Guey, Cary, NC (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 552 days.

(21) Appl. No.: 11/875,576

(22) Filed: Oct. 19, 2007

(65) Prior Publication Data

US 2009/0103558 A1  Apr. 23, 2009

(51) Int. Cl.
*H04W 4/00* (2009.01)

(52) U.S. Cl. ........................... 370/328; 370/447

(58) Field of Classification Search .................. 370/447, 370/328, 330
See application file for complete search history.

(56) References Cited

U.S. PATENT DOCUMENTS

| | | | |
|---|---|---|---|
| 5,345,594 A * | 9/1994 | Tsuda | 455/18 |
| 5,892,769 A | 4/1999 | Lee | |
| 6,078,568 A | 6/2000 | Wright et al. | |
| 6,240,083 B1 | 5/2001 | Wright et al. | |
| RE37,301 E * | 7/2001 | Lo | 370/448 |
| 6,967,937 B1 | 11/2005 | Gormley | |
| 7,468,972 B2 * | 12/2008 | Walsh et al. | 370/348 |
| 2005/0053029 A1 | 3/2005 | Lee et al. | |
| 2005/0149649 A1 | 7/2005 | Carneal et al. | |
| 2006/0040702 A1 | 2/2006 | Willenegger et al. | |
| 2007/0038736 A1 | 2/2007 | Jorgensen | |

FOREIGN PATENT DOCUMENTS

| | | |
|---|---|---|
| CA | 02549326 | 8/2000 |
| WO | 2007/073040 | 6/2007 |

OTHER PUBLICATIONS

Phan, V. "Smart Packet Access and Call Admission Control for Efficient Resource management in Advanced Wireless Networks." Academic Dissertation, University of Oulu, Finland, 2005.
Tobias, F. et al. "The Winner II Air Interface: Refined Multiple Access Concepts." IST-4-027756 Winner II, D4.6.1 Version 1.0.
Bertsekas, D. et al. Data Networks (Second Edition). Prentice-Hall, Inc., Upper Saddle River, NJ, 1992. pp. 271-288.
Co-pending U.S. Appl. No. 11/531,587 to Zangi et al., filed Sep. 13, 2006.
Pakes, A.G. "Some Conditions for Ergodicity and Recurrence of Markov Chains." Operations Research, 1983, vol. 31, pp. 783-789.
Roberts, L.G. "Aloha Packet System with and without Slots and Capture." Stanford Research Institute, Advanced Research Projects Agency, Network Information Center. Available at: http://packet.cc/files/aloha.html.

(Continued)

*Primary Examiner* — Kevin C Harper
*Assistant Examiner* — Henry Baron
(74) *Attorney, Agent, or Firm* — Coats & Bennett, P.L.L.C.

(57) ABSTRACT

One or more embodiments taught herein provide a hybrid access arrangement using a contention-based channel and a scheduled channel on a communication link. As a point of significant efficiency, given users transmit autonomously on the contention-based channel, without need for scheduling overhead. However, if a contention overload occurs on the contention-based channel, the involved users are identified from unique signature sequences included in their user transmissions. The identified users are temporarily managed as scheduled users on the scheduled channel, which supplements the contention-based channel and therefore may use limited communication link resources in comparison to the contention-based channel. Users not involved in the contention overload generally continue operating on the contention-based channel.

20 Claims, 3 Drawing Sheets

OTHER PUBLICATIONS

Rivest, R. L. "Network Control by Bayesian Broadcast." IEEE Transactions on Information Theory, vol. IT-33, No. 3, May 1987, pp. 323-328.

Munkres, J. R. Topology: A First Course. Prentice-Hall, Inc., Englewood Cliffs, New Jersey, 1975. pp. 45-51.

Chitre D M et al., Random Access With Notification—A New Multiple-Access Scheme for VSAT Networks, Comsat Technical Review, Communications Satellite Corporation, Washington, US, vol. 19, No. 1, Mar. 21, 1989, pp. 99-121.

* cited by examiner

HYBRID CONTENTION-BASED AND SCHEDULE-BASED ACCESS TO A COMMUNICATION LINK

BACKGROUND

1. Technical Field

The present invention generally relates to multiple access control to a communication link, such as the uplink in a wireless communication network, and particularly relates to using a hybrid of contention-based access and schedule-based access.

2. Background

As current and future wireless communication networks transition away from circuit-switched communications and toward packet-switched communications, resource allocation becomes more flexible and more challenging. For example, in packet-switched environments, resource allocations tend to be made on a demand basis. Further, resource allocations to individual users tend to be of short duration, reflecting the bursty, intermittent nature of many packet-switched communication applications, such as web browsing, etc.

As one example, packet-based communication applications and services complicate the allocation of common uplink resources in cellular and other wireless communication networks, such as where a potentially large group of users in a given cell share a common communication uplink. One sharing approach depends on resource reservation techniques, wherein individual users access the common uplink on a reserved basis. Scheduling access to the communication link in this manner has the advantage of controlling the group of users in a manner that avoids conflicting transmissions (i.e. simultaneous transmission on the same physical resource by more than one user) but the scheduling request/grant signaling adds potentially significant overhead to the communication link, and adds complexity to the managing base station.

As an alternative, contention-based access offers potentially greater communication link efficiency by eliminating the signaling overhead of scheduled access. With contention-based access, each user vying for access to the communication link transmits autonomously, meaning that collisions between user transmissions occur from time to time. Commonly, the base station or other receiving entity can demodulate more than one user's transmission at the same time, so collisions do not necessarily mean loss of user data. However, interference or practical constraints on demodulation resources generally limits the number of simultaneous user transmissions that can be successfully received. The term "contention overload" denotes the occurrence of more than the maximum allowed number of simultaneous user transmissions, where that number may be fixed, or may change depending upon prevailing reception conditions and loading at the base station.

As a common point, conventional contention-based access schemes assume that no user transmissions can be received (demodulated) correctly in the presence of a contention overload, meaning that all user transmissions are "lost" in such events and the channel resources used for those transmissions were completely wasted. Worse, without provisions to stagger or otherwise disperse retransmissions on the contention-based channel, the users involved in a contention overload all may attempt retransmissions at or about the same time, thereby risking a further contention overload. As a general proposition, therefore, contention overloads may be understood as potentially reducing or eliminating the efficiency gains that come with the elimination of scheduling overhead from the communication link.

SUMMARY

One or more embodiments taught herein provide a hybrid access arrangement using a contention-based channel and a scheduled channel on a communication link, e.g., a wireless communication network uplink. As a point of significant efficiency, given users transmit autonomously on the contention-based channel, without need for scheduling overhead. However, if a contention overload occurs on the contention-based channel, where too many users simultaneously transmit on the contention-based channel, the involved users are identified from unique signature sequences included in their user transmissions.

Heretofore, the particular users involved in a contention overload could not be identified, and therefore no basis was available for managing them in specific response to their involvement in a contention overload. As taught herein, user transmissions include unique signature sequences, which, for example, may be defined from a base sequence of length N using circular delay-Doppler shifts. These sequences allow a base station or other receiver to identify the users involved in a contention overload, even if the data portions of the user transmissions cannot be demodulated. The identified users are temporarily managed as scheduled users on the scheduled channel, which supplements the contention-based channel and therefore may use limited communication link resources in comparison to the contention-based channel. Users not involved in the contention overload generally continue operating on the contention-based channel.

Accordingly, one embodiment of a method of managing multiple user access to a communication link comprises receiving user transmissions on a contention-based channel of the communication link that supports a maximum number of simultaneous user transmissions, wherein each user transmission includes a unique signature sequence, and detecting contention overloads where more than the maximum number of users simultaneously transmit on the contention-based channel. The method also includes identifying the users involved in a contention overload based on the unique signature sequences received from those users, and scheduling retransmissions for one or more of the identified users on a scheduled channel of the communication link.

In another embodiment, a method of managing multiple users sharing access to a communication link comprises defining a contention-based channel on the communication link, defining a scheduled channel on the communication link, and receiving user transmissions on the contention-based channel from individual users transmitting autonomously on the contention-based channel, wherein each user transmission on the contention-based channel includes a unique signature sequence. The method further comprises detecting a contention overload on the contention-based channel where too many users simultaneously transmit on the contention-based channel, identifying the users involved in the contention overload based on successfully decoding the unique signature sequences received during the contention overload, and sending retransmission schedule information to the identified users to control scheduled retransmissions by the identified users on the scheduled channel.

In another embodiment, a base station for use in a wireless communication network is configured to manage multiple user access to a communication link supported by the base station. The base station comprises receiver circuits and one or more processing circuits that are operatively associated with the receiver circuits. The receiver circuits are configured to receive user transmissions on a contention-based channel of the communication link, where the contention-based channel supports a maximum number of allowed simultaneous user transmissions, and where each user transmission includes a unique signature sequence. Correspondingly, the processing circuits are configured to detect contention overloads, where more than the maximum number of users simultaneously transmit on the contention-based channel. Further, the processing circuits are configured to identify the users involved in a contention overload based on the unique signature sequences received from those users, and schedule retransmissions for one or more of the identified users on a scheduled channel of the communication link.

In yet another embodiment, a downlink control channel is provided for use in association with an uplink data channel that provides a contention-based channel and an associated scheduled data channel supporting overflow from the contention-based channel. The propagated downlink control channel signal comprises, for individual user transmissions received on the contention-based channel in the absence of a contention overload, individualized reception acknowledgement information corresponding to the individual user transmissions. The signal further comprises, for individual user transmissions received on the contention-based channel in the presence of a contention overload, individualized retransmission scheduling information directing users identified as being involved in the contention overload to conduct scheduled retransmissions on the scheduled channel. In this manner, the signal carries ack/nack or other acknowledgement information, for providing reception feedback to users transmitting to a base station or other network receiver on a contention basis. The signal further carries, when needed, retransmission scheduling information, to direct or otherwise control rescheduled transmissions by users whose transmissions were lost or otherwise compromised by the occurrence of a contention overload on the contention-based channel.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
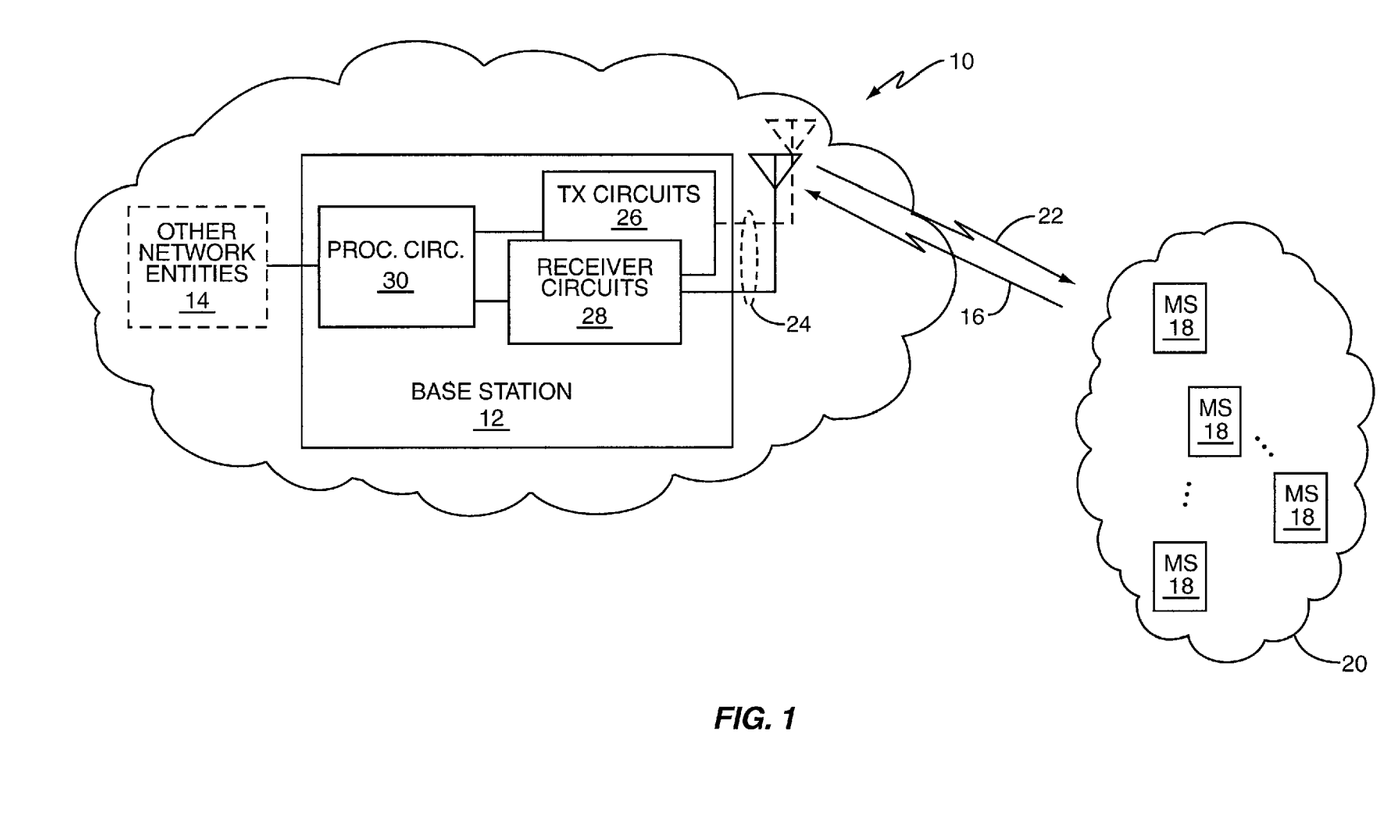
FIG. 1 is a partial block diagram of a wireless communication network, including a base station configured to implement one embodiment of a hybrid access scheme that combines contention-based and scheduled-based access to communication uplink resources.

By way of non-limiting example, FIG. 1 partially illustrates a wireless communication network 10, which includes a base station 12 and one or more other entities 14. The base station 12 provides an uplink communications channel 16 for receiving user transmissions from individual mobile stations 18 in a group 20 of mobile stations based on a hybrid multiple access arrangement, wherein it manages both contention-based and scheduled-based access to the uplink communications channel 16. The base station 12 further provides a downlink communications channel 22 for sending transmissions to mobile stations 18 in the group 20, including control signaling associated with its management of the hybrid multiple access. Supporting those communication links, the illustrated base station 12 includes one or more transmit/receive antennas 24, along with associated transmitter and receive circuits 26 and 28, respectively, and further includes one or more processing circuits 30 that are operatively associated with the transmitter and receiver circuits 26 and 28.

Figure 2:
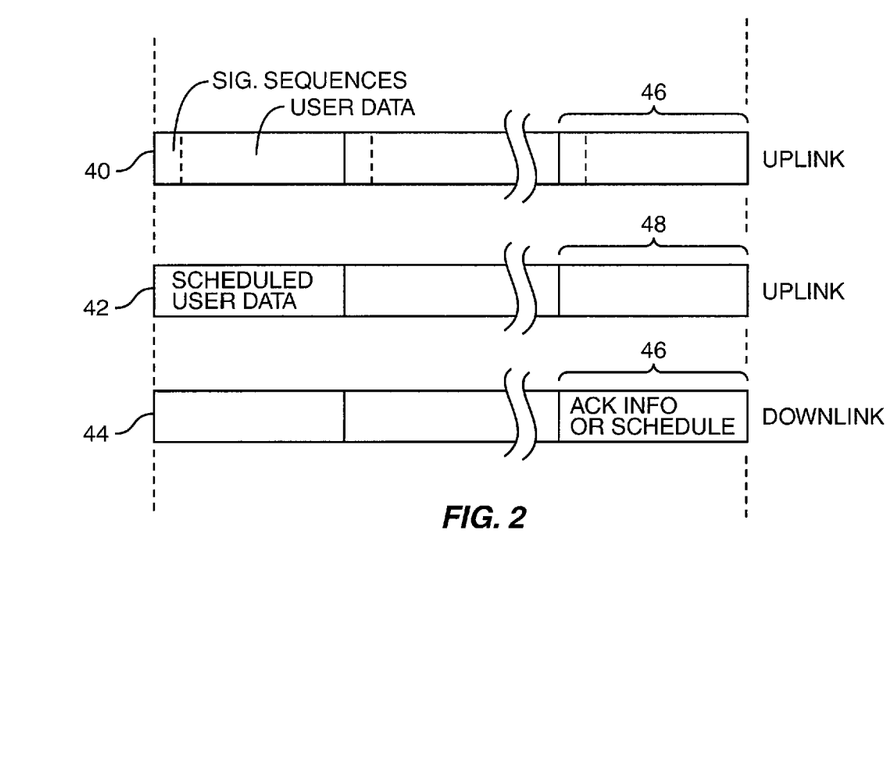
FIG. 2 is a block diagram of one embodiment of contention-based and schedule-based uplink channels for hybrid multiple access, and a corresponding downlink control channel for controlling such access.

As illustrated by way of non-limiting example in FIG. 2, the base station 12 supports hybrid multiple access by defining a contention-based channel 40 and a schedule-based channel 42 on the communications uplink 16, along with a corresponding control channel 44 on the downlink for managing such access. Broadly, the individual mobile stations 18 (which are conveniently referred to as "users") transmit autonomously on the contention-based channel 40, on an as-needed basis. If a contention overload occurs on the contention-based channel 40, the base station 12 identifies the individual mobile stations 18 that were involved in the contention overload, and temporarily manages the involved mobile stations 18 as scheduled users on the scheduled channel 42, by sending individualized retransmission scheduling information to the involved users on the downlink control channel 44. Users not involved in the contention overload generally continue operation on the contention-based channel 40.

Operation of the scheduled channel 42 in a sense "supplements" the contention-based channel 40, in that scheduled transmissions are used as needed to manage the retransmission of user data from users involved in contention overloads. This limited usage allows the contention-based channel 40 to be managed aggressively without suffering the deleterious effects conventionally caused by contention overloads. Further, the use of the scheduled channel 42 as a supplemental or secondary channel—e.g., to handle contention overflows from the primary, contention-based channel 40—means that the scheduled channel 42 may be allocated relatively few resources from the communication link 16, in comparison to the contention-based channel 40. As such, the existence of the scheduled channel 42 does not represent a significant reservation of resources. Moreover, in at least one embodiment the scheduled channel is dynamically allocated as needed, responsive to the occurrence of contention overloads.

In any case, the downlink control signal 44, which is propagated from the base station 12 through the transmission medium to the group 20 of mobile stations 18, serves the dual purpose of conveying acknowledgement information for users that transmitted on the contention-based channel 40 in the absence of a contention overload, conveying retransmission scheduling information for users that transmitted on the contention-based channel 40 in the presence of a contention overload. In other words, for the illustrated signal configurations, for any given transmission slot 46, the base station 12 receives a given number of simultaneous user transmissions. If too many users are transmitting in that slot 46, a contention overload occurs and the base station decodes or otherwise determines, e.g., using correlation processing, the unique signature sequences of the users that transmitted in that slot 46. At least for the users it successfully identifies, the base station 12 determines retransmission schedules, and subsequently transmits individualized retransmission scheduling information on the downlink control channel signal 44. Note that the downlink control channel 44 may use slots 46 which are synchronized with a fixed offset interval from that start of the slot in which the contention-based signal was transmitted.

Conversely, for any given slot 46 of the contention-based channel 40 where no contention overload occurs, the base station 12 uses the downlink control channel 44 to send individualized acknowledgement information to the users that transmitted in that slot 46. Thus, in response to contention overloads on the (uplink) contention-based channel 40, the downlink control channel signal 44 carries retransmission scheduling information. For a given contention overload, that information identifies the schedules to be used by the involved users for retransmitting the lost information on the scheduled channel 42, which also may be slotted according to transmission slots 48. The timing of slots 48 may or may not match the timing of slots 46. Further, in response to user transmissions received in the absence of contention overloads, the downlink control channel 44 carries ack/nack or other acknowledgement signaling, indicating to the individual transmitting users whether their transmissions were or were not successfully received.

Accordingly, if an individual user not involved in a contention overload is acked on the downlink control channel 44, that user stays in the "contention pool," and retransmits as needed on the contention-based channel 40. Conversely, one or more of the individual users that are involved in a contention overload are temporarily removed from the contention pool and placed in a "scheduled pool," where the user information lost because of the contention overload is transmitted by them on a scheduled basis on the scheduled channel 42. Those scheduled transmissions are controlled by the retransmission scheduling information sent by the base station 12 on the downlink control channel 44. Thus, the base station 12 may be configured to send individualized acknowledgment information to the users that transmitted in a given transmission slot 46 (of the contention-based channel 40), if a contention overload did not occur in the given transmission slot, and otherwise to send individualized scheduling information to those users. In this case, retransmission schedule information can be sent at least to the extent that unique signature sequences were successfully received from the users that transmitted in the given transmission slot.

Figure 4:
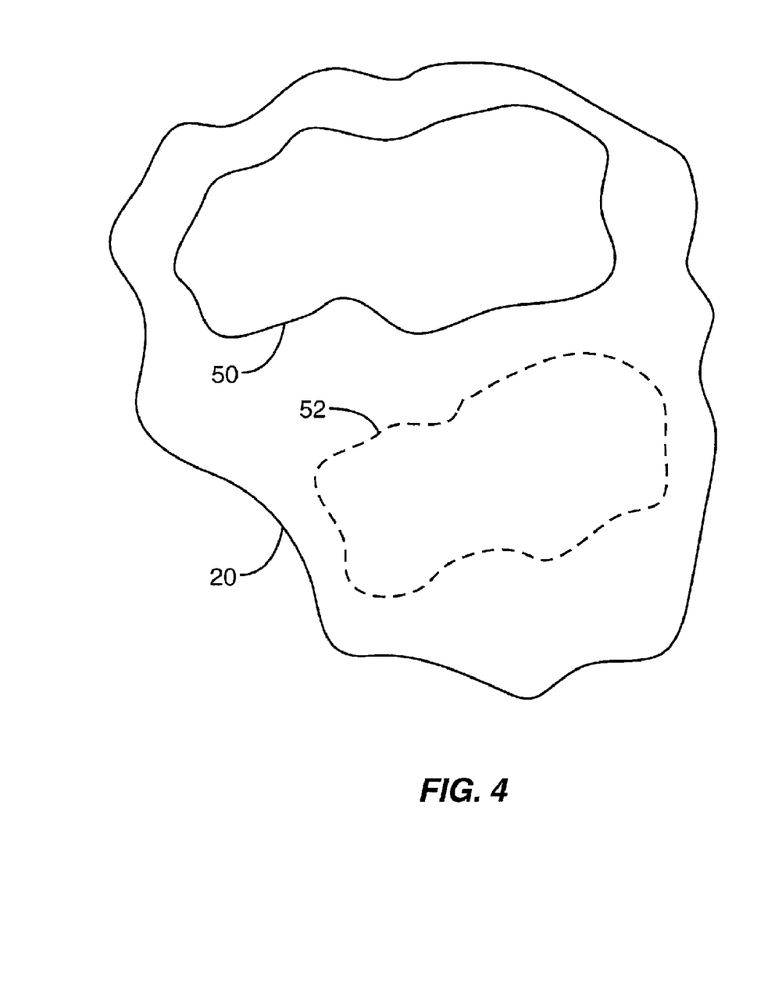
FIG. 4 is a block diagram of user categorizations, where subgroups of users (mobile stations) are managed on a contention basis and, as needed, on a scheduled basis.

In at least one embodiment, the base station 12 individually acknowledges mobile station transmissions it receives on the contention-based channel 40, and the mobile stations 12 are programmed to listen for such acknowledgements. However, rather than nacking incorrectly received transmissions, which would leave nacked mobile stations in the contention pool 50, the base station 12 sends individualized retransmission scheduling information to mobile stations 18 whose contention-based channel transmissions were incorrectly received. In this case, the base station 12 effectively temporarily removes a mobile station 18 from the contention pool 50 if this mobile station's transmission was incorrectly received at the base station 12, regardless of whether a contention overload occurred. Of course, if a contention overload did occur, the base station 12 may move all the mobile stations 18 identified as being involved in that contention overload temporarily into the scheduled pool 52.

In more detail, the base station 12 receives user transmissions on the contention-based channel 40 on a transmission slot basis, and correspondingly sends synchronized control information to the transmitting mobile stations 18. Let $t\_\{j\}$ denote the start time of the j-th slot. Assuming that the delay between the base station 12 receiving transmissions in the j-th slot of the contention-based channel 40 and transmitting corresponding individualized control information on the downlink control channel 44 is D slot durations, each mobile station 18 can be configured to listen for control information on the downlink control channel 44 at time $t_j+D$, for feedback regarding its packet transmission on the contention-based channel 40 at time $t_j$.

Accordingly, the base station 12 is configured to receive user transmissions in slot j of the contention-based channel 40, determine the unique signature sequences for the transmitting mobile stations 18 by time $t_{j+k}$ (where k may be more or less than one slot's time, but is less than D), and send the appropriate, individualized control information in slot j+D of the downlink control channel 44. In one embodiment, the base station 12 acks correctly-received transmissions but sends retransmission scheduling information to any mobile station 18 whose contention-based transmission was incorrectly received; in other embodiments, the base station 12 sends ack/nack signaling as appropriate, unless a contention overload occurs, in which case it sends retransmission scheduling information to one or more of the involved mobile stations 18. Preferably, the base station 12 sends retransmission scheduling information to all of the mobile stations 18 involved in a contention overload, at least to the extent that it can successfully identify them from the received signature sequences.

Of course, these signaling protocols and the corresponding illustrated channel arrangements may be advantageous in at least some applications, but they are not intended to be limiting. For example, the downlink signaling (ack/nack, retransmission scheduling) need not be consolidated onto one channel, nor does ack/nack versus retransmission signaling necessarily need to be done using the same channel, although that approach is convenient. More broadly, the base station 12 is configured to implement a method of managing multiple user access to a communication link which represents a hybrid of contention-based and schedule-based access to the communication uplink 16.

To this end, the processing circuit(s) 30 of the base station 12 may be correspondingly configured. For example, the processing circuit(s) 30 may comprise one or more general- or special-purpose microprocessor circuits configured according to computer program instructions stored in a computer readable medium included within the base station 12. However, regardless of whether the method is implemented in hardware, software, or any combination thereof, FIG. 3 illustrates a broad embodiment of hybrid contention-based and schedule-based multiple access, such as may be performed by or for the base station 12.

The processing "begins" with the base station 12 receiving user transmissions on a contention-based channel 40 of the communication link 16, where that link supports a maximum number of simultaneous user transmissions, and wherein each user transmission includes a unique signature sequence (Block 100). Processing continues with detecting contention overloads where more than the maximum number of allowed users simultaneously transmit on the contention-based channel 40 (Block 102), and continues with identifying the users involved in a contention overload based on the unique signature sequences received from those users (Block 104). Processing further continues with scheduling retransmissions for one or more of the identified users on a scheduled channel 42 of the communication link 16 (Block 106).

Figure 3:
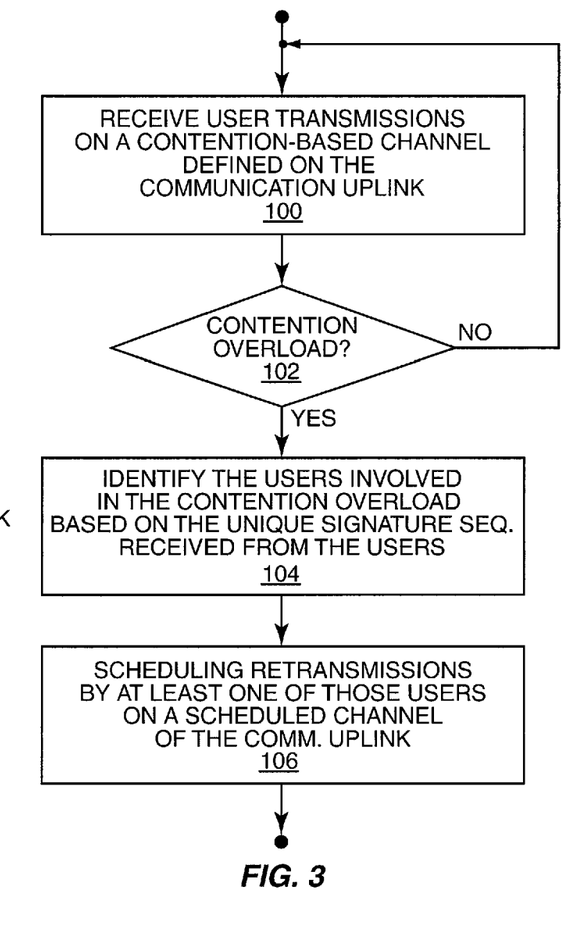
FIG. 3 is a logic flow diagram illustrating one embodiment of processing logic for implementing a method of hybrid multiple access.

Referring back to FIG. 2, one sees that the processing of FIG. 3 may be performed or otherwise looped through on a transmission-slot basis. For example, receiving user transmissions on the contention-based channel 40 may comprise receiving user transmissions within synchronized transmission slots 46 of the contention-based channel 40. Thus, detecting contention overloads comprises detecting contention overloads on a transmission slot basis, and identifying the users involved in a contention overload comprises identifying users on a transmission slot basis. With that, scheduling retransmissions comprises, for a given transmission slot 46 in which a contention overload occurred, sending scheduling information to the users identified from the unique signature sequences that were received in the given transmission slot 46.

However, whether or not transmission on the contention-based channel 40 is performed on a transmission slot basis, FIG. 4 illustrates that the hybrid multiple access teachings presented herein manage the group 20 of mobile stations 18 as a contention pool 50 and a scheduled pool 52. By default, individual users operate in the contention pool 50, where each one autonomously transmits on the contention-based channel 40 on an as-needed basis. To the extent that those autonomous user transmissions result in contention overloads, one or more of the involved users is moved from the contention pool 50 to the scheduled pool 52, where the retransmission of information lost from those users because of the contention overload is retransmitted on a scheduled basis via the scheduled channel 42. In that sense, the base station advantageously identifies the specific users involved in a given contention overload, and temporarily moves one or more of the identified users from the contention pool 50 to the scheduled pool 52. Users remaining in the contention pool 50 continue contention-based transmissions.

Scheduling retransmissions for one or more of the identified users on a scheduled channel 42 of the communication link 16 comprises, for example, determining retransmission schedule information for each of the one or more identified users, and sending the retransmission schedule information to the one or more identified users. In this manner, those users operate at least temporarily as scheduled users on the scheduled channel 42. As noted, such retransmission schedule information may be transmitted on the downlink control channel 44, on an individualized basis.

As further noted, the resources from the communication link 16 needed to support the scheduled channel 42 are, in one or more embodiments, dynamically allocated from the communication link 16 for scheduled channel use, in response to detecting contention overloads. Of course, embodiments are also contemplated where resources for the scheduled channel 42 are allocated statically from the communication link for scheduled channel use. Of course, even static allocations may be updated from time to time, but at any given time some resources may be reserved for the scheduled channel 42 even if scheduled retransmissions are not ongoing.

In both static and dynamic allocation embodiments, the base station 12 may be configured to define the contention-based channel 40 and the scheduled channel 42 based on allocating channel resources from the communication link 16. For example, those channel resources comprise at least one of frequency, time, and code channelization resources. Depending upon the particulars of the air interface adopted by the base station 12 and the mobile stations 18, the channel allocations may comprise allocating or otherwise reserving blocks of Orthogonal Frequency Division Multiplex (OFDM) subcarriers within a larger OFDM carrier spectrum. More generally, the allocations represent some allocation of channelization resources (code, time, and/or frequency) on the communication uplink 16, that allows the contention-based channel 40 and the scheduled channel 42 to coexist, and allows individual users to be assigned to one or the other channels.

As another advantageous variation, the processing circuit(s) 30 may be configured to indicate whether scheduled retransmissions are to be full retransmissions or partial retransmissions that exploit incremental or redundant decoding. In other words, as a basic embodiment, the base station 12 and mobile stations 18 can be configured such that retransmission of user data lost in a contention overload is done as a simple, full retransmission of the data that was lost. However, the base station 12 and mobile stations 18 may be configured to use, for example, a form of Hybrid Automatic Repeat Requests (HARQ) for the retransmissions. In such embodiments, the mobile stations 18 take advantage of the fact that user transmissions may not have been entirely lost or corrupted during a contention overload, meaning that incrementally redundant retransmissions may be sent on the scheduled channel 42, thereby making more efficient use of that channel's resources. The base station 12 therefore can indicate to the retransmitting users the extra redundancy that should be sent on the scheduled channel 42.

Turning from retransmission scheduling details, it should be noted that shifting users involved in contention overloads from the contention pool 50 to the scheduled pool 52 depends on the ability to identify the users involved in contention overloads, even if the user data sent by them is lost because of the overload. The unique signature sequences described herein represent an advantageous mechanism for the base station 12 reliably identifying users during a contention overload.

A United States provisional patent application entitled, "Novel Signature Sequence Design for Time-Frequency Selective Channel," was filed on 12 Jan. 2007 and has been assigned Application Ser. No. 60/884,703. This '703 application is incorporated in its entirety herein by reference, and it sets forth exemplary details regarding the generation and use of unique signature sequences. For example, the processing circuit(s) 16 at the base station 12 may be preconfigured with a set of unique signature sequences that it dynamically assigns to mobile stations 18 being supported by it, or it may be configured with a generation algorithm allowing it to dynamically generate the sequences.

According to the teachings presented in the '703 application, the time-frequency selectivity in a wireless communication channel essentially arises from the results of the delay-Doppler shifts imparted to the signal by scattering within the propagation environment. Because of these effects, the propagated signal taken at the propagation channel output exhibits an expansion in the delay-Doppler domain. One may therefore create a number of uniquely distinguishable signals by artificially introducing different delay-Doppler shifts to a well designed base signal. Sequence sets constructed this way are quite useful for, but not limited to, identifying a large number of mobile stations 18 vying for contention-based access on the contention-based channel 40.

Use of signature sequences in the above context depends on the ability of a pair of signature sequences to be distinguished from each other at the receiving base station. That ability often is measured by the cross correlation function between sequences, which is defined as, $$\sum_{n=0}^{N-1} s_0[n]s_1^*[n], \quad \text{Eq. (1)}$$

where N is the sequence length. In a time-dispersive (frequency selective) channel, a good signature sequence also needs to be distinguishable from its multipath echoes. That requirement dictates good autocorrelation performance, where the autocorrelation function is defined as, $$\sum_{n=0}^{N-1} s_0[n]s_0^*[n-\tau], \quad \text{Eq. (2)}$$

for $\tau=0, \ldots N-1$. (Unless otherwise specified, indexing in this context is modulo N.)

The above functions and considerations suggest circular operations that can be achieved in practice by introducing cyclic prefixes of appropriate length, such as known in OFDM communication systems. Consequently, the most commonly used metrics for signature sequence design in a time-dispersive channel is simply the cross correlation function defined as, $$\phi_{s_0, s_1}[\tau] \equiv \sum_{n=0}^{N-1} s_0[n]s_1^*[n-\tau]. \quad \text{Eq. (3)}$$

In the case where $s_0[n]=s_1[n]$, the cross-correlation function becomes an autocorrelation function. A good sequence set should then have small cross correlation between any pair of sequences at all lags and small autocorrelation at non-zero lag for all individual sequences. In cases where the system of interest is synchronized up to the sequence length, the same sequence can be circularly shifted and assigned to more than one device as long as the relative circular shifts are more than the channel's maximum delay spread. The common pilot code for CDMA2000 is such an example where different circular shifts are used to differentiate the pilot signals of different base stations, even though the same pilot sequence is used across the base stations.

Accordingly, one embodiment for signature sequence generation begins with an arbitrary base sequence s[n] of length-N. From this base sequence, a set of sequences can be derived by introducing a circular delay-Doppler shift to the base sequence as follows:

$$s_{l,m}[n] = s[n - l\tau_d]e^{j\frac{2\pi m v_d n}{N}}, \quad \text{Eq. (4)}$$

where $(\tau_d, v_d)$ is the minimum delay-Doppler separation between any pair of derived sequences and (l,m) is the unique identification index associated with the derived sequence.

If the base sequence is properly selected, each derived sequence in the set can be uniquely identified even after passing through a time-frequency selective propagation channel, provided that the minimum delay-Doppler separation $(\tau_d, v_d)$ is greater than the propagation channel's maximum delay-Doppler spread $(\tau_{max}, v_{max})$. The number of available ambiguity-free sequences is therefore limited by $N^2/\tau_{max} \times v_{max})$.

As a specific advantageous example of an ideal base sequence for generation of the unique signature sequences used herein, consider that a BPSK (±1) modulated m-sequence s[n] has the special property that the product $s[n]s^*[n-\tau]$ is another m-sequence for any nonzero integer $\tau$. Furthermore, the DFT of an m-sequence is given by, $$\left| \sum_{n=0}^{N-1} s[n]e^{-j\frac{2\pi nk}{N}} \right| = \begin{cases} 1, k = 0 \\ \sqrt{N+1}, k \neq 0 \end{cases}. \quad \text{Eq. (5)}$$

In other words, the cross-correlation between any pair of sequences in the set of $N^2$ distinct sequences derived from a length-N m-sequence is at most $\sqrt{N+1}$.

In practice, it may sometimes be desirable to choose a sequence length long enough to cover several times the maximum number of devices in the system such that subsets of the sequences can be reused by multiple adjacent systems. In the context of this disclosure, that means that the individual mobile stations 18 in the group 20 may be assigned a unique signature sequence taken from a subset of signature sequences, while other signature sequences in the larger set are allocated for similar use by neighboring base stations. (The same idea can be used for sectorized cells, where different subsets of signature sequences are used for different sectors of the same cell.)

At the base station 12, the receiver circuits 28 (and/or the processing circuits 30) can be configured to robustly detect the signature sequences included in user transmissions, even in the presence of contention overloads that can prevent the base station 12 from successfully receiving the user data in the simultaneous transmissions causing the contention overload. To understand sequence detection, it may be helpful to explore an optimal detector of a single sequence in the generalized maximum likelihood sense. Assuming that the only channel information available is the maximum delay-Doppler spread $(\tau_{max}, v_{max})$, the optimal detection of a single sequence is to evaluate the generalized likelihood function, $$\gamma[l, m] = \sum_{\tau=l\tau_d}^{l\tau_d+\tau_{max}-1} \sum_{v=mv_d}^{mv_d+v_{max}-1} |I[\tau, v]|^2, \quad \text{Eq. (6)}$$

for all hypotheses of [l,m], where $$I[\tau, v] = \sum_{n=0}^{N-1} r[n]s^*[n-\tau]e^{-\frac{j2\pi vn}{N}} \quad \text{Eq. (7)}$$

is the delay-Doppler image defined over $0 \leq \tau < N$, $0 \leq v < N$, and r[n] is the received signal. The hypothesis with the largest log-likelihood is determined as the transmitted sequence.

Even though the metric given in Eq. (6) is optimal only when there is exactly one sequence in the system, it can also be used to detect multiple sequences if proper normalization and thresholding are employed. Thus, the base station 12—e.g., by appropriate configuration of the receiver circuits 28 and/or the associated processing circuits 30—can be configured to implement a sequence detector that enables it to identify a large number of unique signature sequences in robust fashion.

More particularly, the base station's detection and identification of unique signature sequences is more robust than its ability to reliably demodulate user data received in user transmissions from the mobile stations 18, and it can resolve a large number of individual signature sequences in comparison to the largest number of mobile stations 18 that may be expected to simultaneously transmit on the contention-based channel 40 at any given time. For example, if M represents the maximum number of simultaneous user transmissions that the base station 12 can demodulate, then the number of unique signature sequences that the base station 12 can detect is >>M.

That ability depends on proper sequence generation. Accordingly, an m-sequence of length-N is selected as a base sequence. Circular delay-Doppler shifts applied to this base sequence produce a set of $N^2$ signature sequences that can be uniquely identified by the base station 12. Particularly, the minimum delay-Doppler spacing $(\tau_d, \upsilon_d)$ used for the circular shifting is chosen so that it is greater than the propagation channel's maximum delay-Doppler spread $(\tau_{max}, \upsilon_{max})$. Each device (e.g., mobile station 18) to be separately distinguished is assigned a sequence with unique index pair (l,m), so that each one can be identified and detected using a two-dimensional delay-Doppler correlator given in Eq. (6).

Note that network simulations/empirical information may be used to set the spacing used for deriving unique signature sequences from the base sequence, and this derivation of unique signature sequences may be done as a design process. The generated sequences can be loaded into non-volatile memory or other storage at the base station 12, for its use during live operation. Alternatively, the base station 12 can be configured with generation logic, such as may be implemented in the processing circuits 30, such that it can generate signature sequences dynamically.

Regardless, it should be understood that for mobile stations 18 sharing the communication link 16 on a contention basis, the base station 12 can be configured to assign a different signature sequence to each one. In at least one embodiment, the assigned signature sequences are transmitted by the base station 12 to the targeted mobile stations 18, for example, as part of control signaling at call set up, or at other times.

Figure 5:
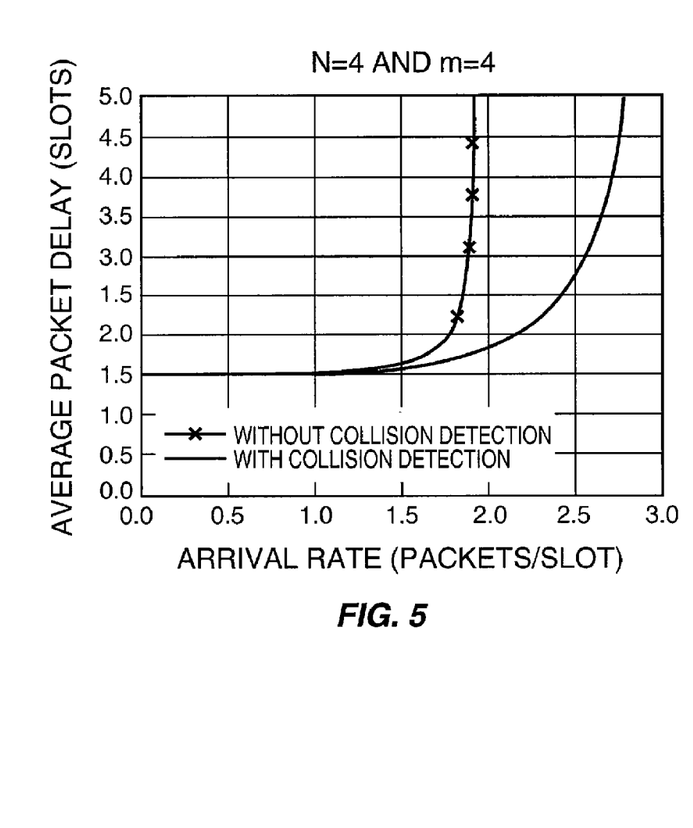
FIG. 5 is a graph comparing the performance of an example base station that uses an embodiment of hybrid multiple access as taught herein with a base station that does not, where performance is plotted in terms of average packet delay versus packet arrival rate (from a transmitting user's perspective).

FIG. 5 illustrates example performance in terms of average packet delay versus new packet arrival rate, for a base station 12 that adopts the hybrid access teachings presented herein. The corresponding performance line is shown without markers, where the plotted performance assumes that the base station 12 can simultaneously receive/demodulate no more than four packets on either the contention-based channel 40 or on the scheduled channel 42. For comparison, the performance is plotted for an otherwise-comparable base station but using "slotted-4-Aloha" without detection of contention overloads and without use of a supplemental scheduled channel for managing retransmissions from contention overloads. That performance line is shown with "X" markers for ready distinction.

Of course, real-world performance depends on a number of implementation details, but it is generally believed that the teachings herein offer performance advantages in many cases. Advantageously, then, these teachings are applicable to a wide range of system types, communication channelization schemes, etc. Along these lines, it also should be understood that the base station 12 may be configured as needed for a particular application and network type. For example, the wireless communication network 10 may comprise a Long Term Evolution (LTE) cellular network in accordance with the relevant Third Generation Partnership Project (3GPP) standards, or, as another example, may comprise an "IMT Advanced" cellular network in accordance with the relevant International Telecommunications Union (ITU) standards.

Of course, these should be understood as non-limiting examples. However, the network/base station type and the particulars of the related air interface protocol may influence the channelization approach taken for the allocation of communication link resources for schedule-based use and contention-based use. This point was noted earlier herein, where it was explained that the communication uplink 16 of FIG. 1 could be separated into logical channels for contention-based use and for schedule-based use by the allocation of OFDM subcarrier blocks, for example. (Of course, the communication uplink 16 may have multiple channels defined within it, including a contention-based channel and a schedule-based channel.)

Broadly, the hybrid multiple access teachings presented herein manage a group of users on a contention basis, by setting aside contention-based channel resources for their usage and tracking the users involved in contention overloads based on receiving identifying signature sequences as part of the contention transmissions. In response to detecting a contention overload, where more than a maximum allowed number of users simultaneously transmit on the contention-based channel, the involved users are identified and retransmission scheduling information is sent to them, causing those users to temporarily operate as scheduled users. The channel resources for scheduled transmissions may be reserved for such usage, or may be dynamically allocated as needed.

With these and other advantages in mind, those skilled in the art will appreciate that the foregoing description and the accompanying drawings represent non-limiting examples of the methods and apparatuses taught herein. As such, the present invention is not limited by the foregoing description and accompanying drawings. Instead, the present invention is limited only by the following claims and their legal equivalents.

What is claimed is:

1. A method of managing multiple user access to a communication link comprising:
   receiving user transmissions on a contention-based channel of the communication link that supports a maximum number of simultaneous user transmissions, wherein each user transmission includes a unique signature sequence;
   detecting contention overloads where more than the maximum number of users simultaneously transmit on the contention-based channel;
   identifying the users involved in a contention overload based on the unique signature sequences received from those users; and
   scheduling retransmissions for one or more of the identified users on a scheduled channel of the communication link.

2. The method of claim 1, wherein scheduling retransmissions for one or more of the identified users on a scheduled channel of the communication link comprises determining retransmission schedule information for each of the one or more of the identified users, and sending the retransmission schedule information to the one or more of the identified users such that the one or more of the identified users operate at least temporarily as scheduled users on the scheduled channel.

3. The method of claim 1, further comprising dynamically allocating channel resources from the communication link for scheduled channel use responsive to detecting contention overloads.

4. The method of claim 1, further comprising statically allocating channel resources from the communication link for scheduled channel use.

5. The method of claim 1, further comprising defining the contention-based channel and the scheduled channel based on allocating channel resources from the communication link, said channel resources comprising at least one of frequency, time, and code channelization resources.

6. The method of claim 1, further comprising indicating whether scheduled retransmissions are to be full retransmissions or partial retransmissions that exploit incremental or redundant decoding.

7. The method of claim 1, wherein receiving user transmissions on a contention-based channel of the communication link comprises receiving user transmissions within synchronized transmission slots of the contention-based channel.

8. The method of claim 7, wherein detecting contention overloads comprises detecting contention overloads on a transmission slot basis, and wherein identifying the users involved in a contention overload comprises identifying users on a transmission slot basis.

9. The method of claim 8, wherein scheduling retransmissions comprises, for a given transmission slot in which a contention overload occurred, sending scheduling information to the users identified from the unique signature sequences that were received in the given transmission slot.

10. The method of claim 7, further comprising sending individualized acknowledgment information to the users that transmitted in a given transmission slot, if a contention overload did not occur in the given transmission slot, and otherwise sending individualized scheduling information to those users, at least to the extent that unique signature sequences were successfully received from the users that transmitted in the given transmission slot.

11. A base station for use in a wireless communication network and configured to manage multiple user access to a communication link supported by the base station, said base station comprising:
receiver circuits to receive user transmissions on a contention-based channel of the communication link that supports a maximum number of simultaneous user transmissions, wherein each user transmission includes a unique signature sequence; and
one or more processing circuits operatively associated with the receiver circuits and configured to detect contention overloads where more than the maximum number of users simultaneously transmit on the contention-based channel, identify the users involved in a contention overload based on the unique signature sequences received from those users, and schedule retransmissions for one or more of the identified users on a scheduled channel of the communication link.

12. The base station of claim 11, wherein the one or more processing circuits include a detection processor configured to detect contention overloads in cooperation with the receiver, an identification processor configured to identify the users involved in contention overloads from the unique signature sequences received during the contention overloads, and a scheduling processor configured to schedule retransmissions on the scheduled channel for the identified users.

13. The base station of claim 11, wherein the one or more processing circuits include a channel allocation processor configured to dynamically allocate channel resources from the communication link for scheduled channel use responsive to the detection of contention overloads.

14. The base station of claim 11, wherein the one or more processing circuits include a channel allocation processor that is configured to define the contention-based channel and the scheduled channel by allocating channel resources from the communication link, said channel resources comprising at least one of frequency, time, and code channelization resources.

15. The base station of claim 11, wherein the one or more processing circuits include a retransmission processor configured to control whether scheduled retransmissions are to be full retransmissions or partial retransmissions that exploit incremental or redundant decoding at the base station.

16. The base station of claim 11, wherein the base station is configured to receive the user transmissions on the contention-based channel within synchronized transmission slots.

17. The base station of claim 16, wherein the base station is configured to detect contention overloads on a transmission slot basis, and to identify the users involved in a contention overload on a transmission slot basis.

18. The base station of claim 17, wherein the base station is configured to schedule retransmissions in response to a contention overload occurring within a given transmission slot by sending scheduling information to the users identified from the unique signature sequences that were successfully received at the base station on the contention-based channel for that given transmission slot.

19. The base station of claim 16, wherein the base station is configured to send individualized acknowledgment information to the users that transmitted in a given transmission slot, if a contention overload did not occur in the given transmission slot, and otherwise send individualized scheduling information to those users for whom unique signature sequences were successfully received at the base station in the given transmission slot.

20. A method of managing multiple users sharing access to a communication link comprising:
defining a contention-based channel on the communication link;
defining a scheduled channel on the communication link;
receiving user transmissions on the contention-based channel from individual users transmitting autonomously on the contention-based channel, wherein each user transmission on the contention-based channel includes a unique signature sequence;
detecting a contention overload on the contention-based channel where too many users simultaneously transmit on the contention-based channel;
identifying the users involved in the contention overload based on successfully decoding the unique signature sequences received during the contention overload; and
sending retransmission schedule information to the identified users to control scheduled retransmissions by the identified users on the scheduled channel.

* * * * *

UNITED STATES PATENT AND TRADEMARK OFFICE
CERTIFICATE OF CORRECTION

PATENT NO. : 7,978,646 B2
APPLICATION NO. : 11/875576
DATED : July 12, 2011
INVENTOR(S) : Zangi et al.

It is certified that error appears in the above-identified patent and that said Letters Patent is hereby corrected as shown below:

In Fig. 5, Sheet 3 of 3, delete "  " and insert -- -- , therefor.

In Column 4, Line 21, delete "receive" and insert -- receiver --, therefor.

Signed and Sealed this
Twenty-first Day of August, 2012

David J. Kappos
*Director of the United States Patent and Trademark Office*